US012633431B2

(12) United States Patent
Kim et al.

(10) Patent No.: US 12,633,431 B2
(45) Date of Patent: May 19, 2026

(54) INSULATED ELECTRIC WIRES

(71) Applicant: LS Eco-Materials., Ltd., Gumi-si (KR)

(72) Inventors: Eun Ah Kim, Suwon-si (KR); Dong Jin Seo, Gunpo-si (KR); Jae Yong Kim, Seoul (KR)

(73) Assignee: LS Eco-Materials., Ltd., Gumi-si (KR)

( * ) Notice: Subject to any disclaimer, the term of this patent is extended or adjusted under 35 U.S.C. 154(b) by 205 days.

(21) Appl. No.: 18/676,482

(22) Filed: May 28, 2024

(65) Prior Publication Data

US 2024/0404723 A1 Dec. 5, 2024

(30) Foreign Application Priority Data

May 31, 2023 (KR) ........................ 10-2023-0069685

(51) Int. Cl.

*H01B 7/00* (2006.01)
*H01B 3/30* (2006.01)
*H01B 17/62* (2006.01)

(52) U.S. Cl.

CPC ............. *H01B 3/306* (2013.01); *H01B 17/62* (2013.01)

(58) Field of Classification Search

CPC .......... H01B 3/306; H01B 7/02; H01B 7/292; H01B 7/295; H01B 3/308; H01B 3/441; H01B 7/0216; H01B 3/42; H01B 7/0225; H01B 3/30; H01B 3/427; H01B 3/447; H01B 7/0208; H01B 13/16; H01B 3/301; H01B 3/421; H01B 3/46; H01B 5/004; H01B 7/0233; H01B 7/04; H01B 13/00; H01B 13/06; H01B 13/14; H01B 13/24; H01B 3/006; H01B 3/10; H01B 3/28; H01B 7/0009; H01B 7/0275; H01B 17/58; H01B 3/305; H01B 3/38; H01B 3/44; H01B 3/445; H01B 3/448; H01B 7/17; H01B 7/29; H01B 13/065; H01B 13/148; H01B 3/025; H01B 3/105; H01B 3/20; H01B 3/307; H01B 3/443; H01B 7/00; H01B 7/08; H01B 7/18; H01B 7/28

See application file for complete search history.

(56) References Cited

U.S. PATENT DOCUMENTS

2014/0220343 A1* 8/2014 Choi ........................ C09D 7/61 428/389
2020/0033286 A1* 1/2020 Ota ...................... G01N 15/088
2020/0373049 A1* 11/2020 Fujito ..................... H01F 41/04

FOREIGN PATENT DOCUMENTS

KR 10-2021-0053720 A 5/2021

* cited by examiner

*Primary Examiner* — Pete T Lee
(74) *Attorney, Agent, or Firm* — Revolution IP, PLLC

(57) ABSTRACT

The present disclosure relates to an insulated electric wire, and more particularly, to an insulated electric wire that has characteristics of a low dielectric constant and a high partial discharge inception voltage (PDIV) by forming a plurality of micropores inside insulating material of an insulating layer. According to the present disclosure, the insulated electric wire may have the plurality of micropores evenly dispersed inside the insulating material of the insulating layer to have the low dielectric constant without lowering the thermal and mechanical properties and increase the PDIV, so the insulated electric wire can be used as the insulated electric wire for the next-generation electric vehicle motors that use a higher voltage than the existing voltage.

7 Claims, 2 Drawing Sheets

(a) (b)

INSULATED ELECTRIC WIRES

TECHNICAL FIELD

The present disclosure relates to an insulated electric wire wound around a rotor, stator, or the like of a motor, generator, or the like, and more particularly, to an insulated electric wire that has characteristics of a low dielectric constant and a high partial discharge inception voltage (PDIV) by forming a plurality of micropores in a varnish used as an insulating material.

BACKGROUND

As environmental issues have become a hot topic around the world, there is a growing interest in electric vehicles using electricity which is a natural fuel, instead of internal combustion engine vehicles using fossil fuels.

The electric vehicles obtain their driving energy from electrical energy. Accordingly, the electric vehicles have the advantage of not generating any exhaust gas and not generating noise from driving.

However, although the electric vehicles were manufactured before gasoline vehicles, the electric vehicles were not put into practical use due to problems such as the heavy weight of batteries and the time required to charge the batteries. However, as pollution problems have recently become more serious, efforts are being made to expand the spread of the electric vehicles at a national level.

Although various support measures are being prepared at the national level to expand the spread of the electric vehicles, a penetration rate of the electric vehicles is still not significantly increasing due to inconveniences in charging, such as the time required to charge the batteries and the absence of battery charging stations.

In order to expand the spread of the electric vehicles, a method of fast charging and power improvement are urgently required. More specifically, since the next-generation motors used in the electric vehicles use a higher voltage than the existing voltage, it is essential to improve a partial discharge inception voltage (PDIV) of the insulated electric wire wound around the rotor, the stator, or the like of the next-generation motors.

In order to improve the PDIV of the insulated electric wire, a method has been proposed to secure the improved PDIV in the insulated electric wire of the same thickness by lowering the dielectric constant of the varnish used as the insulating material.

A method of lowering the dielectric constant of the varnish described above includes a method of lowering the overall polarity by lowering the overall polarity using a monomer that contains a fluorine group in a polymer structure or lowers polarity.

However, the method has limitations in its application to an insulated electric wire because the structure of the insulating material is changed to reduce adhesion, heat resistance, and mechanical properties.

RELATED ART DOCUMENT

Patent Document

Patent Document 1: Korean Patent Laid-Open Publication No. 10-2021-0053720 (published on May 12, 2021)

SUMMARY

In view of the above, the present disclosure provides a low-dielectric insulating material with adhesion and excellent physical properties by including micropores evenly dispersed inside the insulating material, and an insulated electric wire with high partial discharge inception voltage (PDIV) performance.

The problems to be solved by the present disclosure are not limited to those mentioned above, and other problems not mentioned can be clearly understood by those skilled in the art from the following description.

As a means to solve the above-mentioned technical problems, according to embodiments of the present disclosure, an insulated electric wire includes: a conductor; and an insulating layer surrounding the conductor, in which the insulating layer includes a varnish having a plurality of micropores with a cross-sectional area of $3.14\times10^{-6}$ mm$^2$ or less, and when a relative dielectric constant of the insulating layer is expressed as A in Expression 1 below, the relative dielectric constant A of the insulating layer satisfies Expression 2 below.

$$A = 128{,}867 * t * (1/X)\hat{}2.173913 \quad \text{[Expression 1]}$$

$$A \leq 3.2 \quad \text{[Expression 2]}$$

In Expression 1 above, t may refer to a thickness of the insulating layer, and X may refer to a voltage value when a leakage charge is 100 pC after two specimens of the insulated electric wire are cut to a length of 100 mm, coupled, and tied at 20 mm intervals, and then an electrode is connected to the coupled portion of the insulated electric wire whose film is removed at 10 mm long to make a current flow depending on a voltage boosting rate of 10 V/s under conditions of a temperature of 25° C. and a relative humidity of 50% or less.

The varnish may include a solvent and polyamic acid, a solid content of the polyamic acid may be 20 wt % to 30 wt % based on a total weight, and a viscosity at 30° C. may be 1000 cP to 15000 cP.

The solvent may be at least one selected from the group consisting of N-methyl-2-pyrrolidone (NMP), N,N-dimethylacetamide (DMAc), N,N-dimethylformamide (DMF), γ-butyrolactone, cyclohexanone, naphtha-based petroleum-based organic solvents, and aromatic alkyl benzenes.

The insulating layer may have a surface tension of 30 N/m to 45 N/m.

An initial thermal decomposition temperature of the insulating layer measured using a thermo gravimetric analysis (TGA) device may be within a range of 550° C. to 650° C.

The insulating layer may have a glass transition temperature (Tg) of 250° C. to 450° C.

The insulating layer may satisfy the following Expressions 3 and 4.

$$10 \leq Y1 \leq 15 (\text{unit: } kgf/\text{mm}^2) \quad \text{[Expression 3]}$$

$$40 \leq Y2 \leq 70 (\text{unit: } \%) \quad \text{[Expression 4]}$$

In the above Expression 3, after the specimen separated from the insulating layer is manufactured in a form of a film with a thickness of 30 μm to 50 μm, a width of the specimen is uniformly cut to 10 mm, and then the specimen is placed on a tensioner grip at intervals of 30 mm in gauge length, Y1 may refer to a tensile strength calculated from a load at a time when the specimen breaks, measured at room temperature at a tensile speed of 50 mm/min, and in the above Expression 4, after the specimen separated from the insulating layer is manufactured in the form of the film with the thickness of 30 μm to 50 μm, the width of the specimen is uniformly cut to 10 mm, and then the specimen is placed on the tensioner grip at intervals of 30 mm in gauge length, Y2 may refer to an elongation calculated from a tensile length at the time when the specimen breaks, measured at room temperature at a tensile speed of 50 mm/min.

According to the present disclosure, the insulated electric wires may have the plurality of micropores evenly dispersed inside the insulating material of the insulating layer to have the low dielectric constant without lowering the thermal and mechanical properties and increase the PDIV, so the insulated electric wires can be used as the insulated electric wires for the next-generation electric vehicle motors that use a higher voltage than the existing voltage.

The effects of the present disclosure are not limited to those mentioned above, and other effects not mentioned can be clearly understood by those skilled in the art from the following description.

BRIEF DESCRIPTION OF THE DRAWINGS

The attached drawings are intended to describe the contents of the present disclosure in more detail to those skilled in the art, and the technical idea of the present disclosure is not limited thereto.

DETAILED DESCRIPTION

The above objects, other objects, features, and advantages of the present disclosure will be easily understood through the following preferred embodiments related to the attached drawings. However, the present disclosure is not limited to exemplary embodiments described herein, but may be implemented in other forms. On the contrary, exemplary embodiments introduced herein are provided to make disclosed contents thorough and complete and sufficiently transfer the spirit of the present disclosure to those skilled in the art.

In this specification, when an element is referred to as being on another element, it means that an element may be formed directly on another element or that a third element may be interposed therebetween.

Additionally, when a first element (or component) is referred to as being operated or executed on a second element (or component), it should be understood that the first element (or component) is operated or executed in an environment in which the second element (or component) is operated or executed, or operated or executed through direct or indirect interaction with the second element (or component).

In addition, terms used in the present specification are for describing exemplary embodiments rather than limiting the present disclosure. Unless otherwise stated, a singular form includes a plural form in the present specification. Throughout this specification, the term "comprise" and/or "comprising" will be understood to imply the inclusion of stated constituents but not the exclusion of any other constituents.

Figure 1:
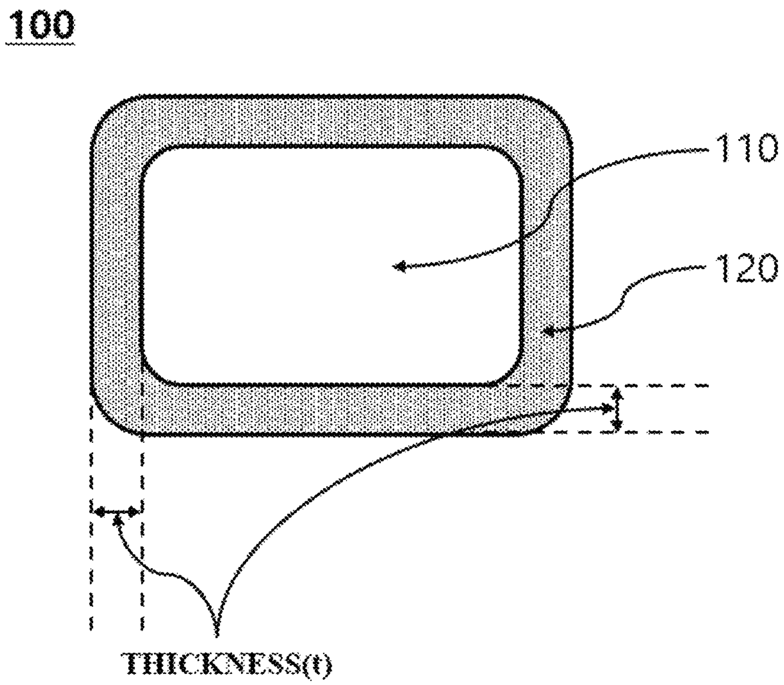
FIG. 1 is a cross-sectional view of insulated electric wires according to an exemplary embodiment of the present disclosure.

FIG. 1 is a cross-sectional view of an insulated electric wire according to an exemplary embodiment of the present disclosure.

As illustrated in FIG. 1, an insulated electric wire 100 include a conductor 110 disposed at a center and an insulating layer 120 surrounding the conductor 110.

The conductor 110 is disposed at the very center of the insulated electric wire 100 and corresponds to a metal part that conducts electricity. The conductor 110 may have a rectangular or circular shape depending on the usage environment, may be composed of a single wire or a stranded wire, and may be configured in a set or composite structure of wires.

The insulating layer 120 is formed to surround the conductor 110 on the outside of the conductor 110 and is formed to insulate the conductor 110. The insulating layer 120 includes a varnish with a plurality of micropores formed therein.

The varnish may include a solvent and polyamic acid, a solid content of the polyamic acid may be 20 wt % to 30 wt % based on a total weight, and a viscosity at 30° C. may be 1000 cP to 15000 cP. Here, the "viscosity" may refer to a viscosity measured at a measurement temperature of 30° C. by measuring a viscous drag of a fluid against a spindle using a Brookfield viscometer, or the "viscosity" may be a flow resistance of the fluid, and refer to a viscosity of a fluid measured at a specific shear rate by rotating the spindle of a Brookfield viscometer.

The micropores are formed to be evenly dispersed inside the varnish. A plurality of micropores formed in the varnish may be formed in a circular or oval shape, and regardless of the shape, it is preferable that the cross-sectional area is $3.14\times10^{-6}$ $mm^2$ or less. That is, it is preferable that the cross-sectional area of the largest pore among the pores found in a photograph taken of a random cross-section of the varnish with a scanning electron microscope (SEM) is $3.14\times10^{-6}$ $mm^2$ or less, and when the shape of the pore is not circular, an equivalent cross-sectional area of a circle may be measured using an image tool.

According to an embodiment of the present disclosure, by evenly dispersing micropores with a cross-sectional area of $3.14\times10^{-6}$ $mm^2$ or less in the varnish used as an insulating material of the insulating layer to lower a dielectric constant without lowering thermal and mechanical properties, it is possible to improve a partial discharge inception voltage (PDIV).

As a method of forming pores in a varnish, a method of forming pores during coating by injecting gas such as nitrogen, argon, or carbon dioxide into a varnish at high pressure, a method of forming pores by mixing solvents with different boiling points and removing a solvent at time difference in an oven during varnish coating, a method of forming pores by dispersing a material with a low temperature, such as PMMA or PS, into a varnish and thermally decomposing the material during coating at a high temperature, a method of forming pores by evenly mixing materials with pores, such as hollow silica and porous silica, into a varnish, and the like may be used to include the pores in the varnish. In the present disclosure, in addition to the method described above, any method that can include pores in the varnish may be adopted.

A surface tension of the insulating layer 120 may be 30 N/m to 45 N/m, and an initial thermal decomposition temperature measured using a thermo gravimetric analysis (TGA) device may be in the range of 550° C. to 650° C. Here, the range of the surface tension of 30 N/m to 45 N/m is the range for uniform application of the insulating layer

120 when manufacturing the insulated electric wire 100, and the surface tension may be measured at room temperature using a ring method. In addition, the thermal decomposition temperature is the temperature at which 5% mass is reduced, and may be measured by the TGA, and may satisfy the heat resistance and structural stability of the insulating layer 120 in the range of 550° C. to 650° C.

In addition, a glass transition temperature (Tg) of the insulating layer 120 may be 350° C. to 450° C. The glass transition temperature is not particularly limited, but may be measured, for example, by dynamic mechanical analysis (DMA), and satisfy the heat resistance and structural stability of the insulating layer 120 in the range of 350° C. to 450° C.

When a relative dielectric constant of the insulating layer 120 is expressed as A in Expression 1 below, the relative dielectric constant A of the insulating layer 120 may satisfy Expression 2 below.

$$A = 128{,}867 * t * (1/X)\hat{}2.173913 \qquad \text{[Expression 1]}$$

$$A \leq 3.2 \qquad \text{[Expression 2]}$$

In Expression 1 above, t refers to a thickness of the insulating layer, and X refers to a voltage value when a leakage charge is 100 pC after two specimens of the insulated electric wire are cut to a length of 100 mm, coupled, and tied at 20 mm intervals, and then an electrode is connected to the coupled portion of the insulated electric wire whose film is removed at 10 mm long to make a current flow depending on a voltage boosting rate of 10 V/s under conditions of a temperature of 25° C. and a relative humidity of 50% or less.

In other words, the insulated electric wire according to an embodiment of the present disclosure may satisfy Expression 2 above by evenly including the plurality of micropores inside the insulating layer to have a low relative dielectric constant even at a thickness of a thin insulating layer, thereby increasing the PDIV.

In addition, the insulating layer 120 may secure the mechanical properties by satisfying Expressions 3 and 4 below.

$$10 \leq Y1 \leq 15(\text{unit: } kgf/\text{mm}^2) \qquad \text{[Expression 3]}$$

In the above Expression 3, after the specimen separated from the insulating layer 120 is manufactured in the form of the film with a thickness of 30 μm to 50 μm, a width of the specimen is uniformly cut to 10 mm, and then the specimen is placed on a tensioner grip at intervals of 30 mm in gauge length, Y1 refers to a tensile strength calculated from a load at a time when the specimen breaks, measured at room temperature at a tensile speed of 50 mm/min.

$$40 \leq Y2 \leq 70(\text{unit: } \%) \qquad \text{[Expression 4]}$$

In the above Expression 4, after the specimen separated from the insulating layer 120 is manufactured in the form of the film with a thickness of 30 μm to 50 μm, a width of the specimen is uniformly cut to 10 mm, and then the specimen is placed on a tensioner grip at intervals of 30 mm in gauge length, Y2 refers to an elongation calculated from a tensile length at a time when the specimen breaks, measured at room temperature at a tensile speed of 50 mm/min.

Meanwhile, the insulating layer 120 may be composed of a plurality of layers (not illustrated) with different properties.

A method of manufacturing an insulated electric wire according to a preferred embodiment of the present disclosure will be described below.

To prepare the insulating material for forming the insulating layer 120, a solvent may be selected. Here, as the solvent, at least one of N-Methy-2-Pyrrolidone (NMP), dimethyl acetamide (DMAc), dimethylformamide (DMF), γ-butyrolactone, cyclohexanone, naphtha-based petroleum-based organic solvent, and aromatic alkyl benzene may be selected depending on the use purpose and physical properties of the insulated electric wire 100. That is, as the solvent in this embodiment, any one of the above-mentioned solvent materials may be used, or a mixture of two or more may be used.

After selecting the solvent, the varnish is prepared by mixing varnish solids, such as polyamic acid, with this solvent, and pores may be formed using a pore forming method described above, for example, a gas injection method into the varnish, etc.

Next, the conductor 110 for the insulated electric wires 100 may be configured. As described above, the conductor 110 may have different appropriate conductor materials and structures depending on the usage environment of the insulated electric wire 100.

The varnish prepared as described above is applied to the conductor 110 to form a polyimide layer. When applying the varnish to the conductor 110, the varnish should be applied evenly on the conductor 110. In this case, in order to manufacture the required structure, the surface tension is formed in the range of 30 N/m to 45 N/m.

After the varnish is evenly applied to the conductor 110, the final insulated electric wire 100 is manufactured under conditions of an oven temperature and a wire speed of a baking temperature of 300° C. or higher. In addition, a covering layer (not illustrated) may be further formed on the outermost side of the insulated electric wires 100 to protect the conductor 110 and the insulating layer 120.

Figure 2:
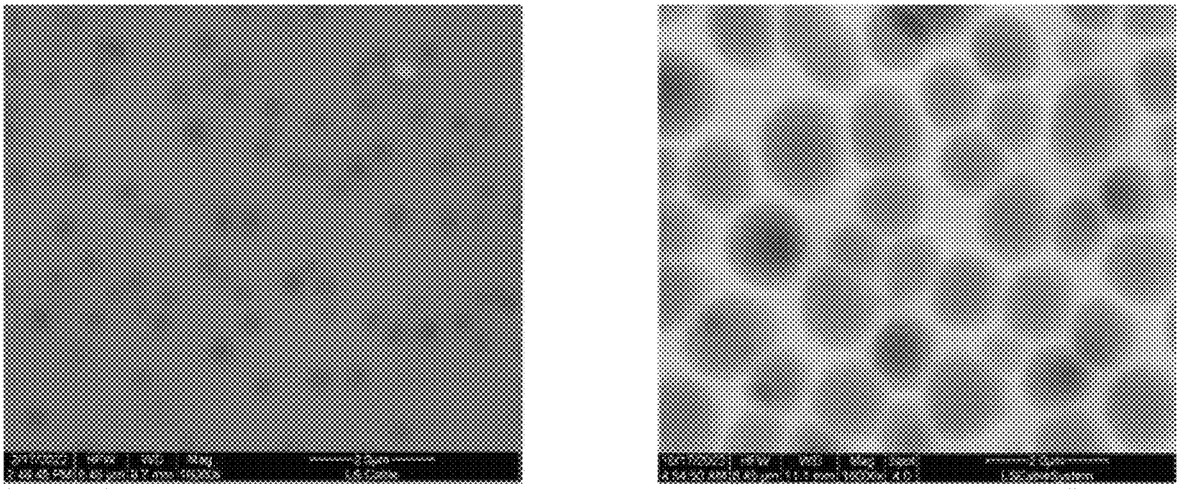
FIG. 2 is an SEM photograph showing an effect of improving an insulating layer of insulated electric wires according to a preferred embodiment of the present disclosure.

FIG. 2 is an SEM photograph illustrating an effect of improving an insulating layer of insulated electric wires according to a preferred embodiment of the present disclosure.

In order to describe the effects of low dielectric constant and high PDIV of the insulated electric wire 100 according to the present disclosure, seven types of insulated electric wire 100 (Examples 1 to 7) manufactured according to the present disclosure and the performance of samples of three existing types of insulated electric wires (Comparative Examples 1 to 3) was tested and compared.

More specifically, in Examples 1 to 7 and Comparative Examples 1 to 3, insulated electric wires were manufactured as follows.

In Example 1, the insulated electric wire having an insulating layer including pores with a cross-sectional area of $0.1 \times 10^{-6}$ mm$^2$ was manufactured.

In Example 2, the insulated electric wire having an insulating layer including pores with a cross-sectional area of $0.03 \times 10^{-6}$ mm$^2$ was manufactured.

In Example 3, the insulated electric wire having an insulating layer including pores with a cross-sectional area of $0.1 \times 10^{-6}$ mm$^2$ was manufactured.

In Example 4, the insulated electric wire having an insulating layer including pores with a cross-sectional area of $0.16\times10^{-6}$ $mm^2$ was manufactured.

In Example 5, the insulated electric wire having an insulating layer including pores with a cross-sectional area of $0.06\times10^{-6}$ $mm^2$ was manufactured.

In Example 6, the insulated electric wire having an insulating layer including pores with a cross-sectional area of $0.02\times10^{-6}$ $mm^2$ was manufactured.

In Example 7, the insulated electric wire having an insulating layer including pores with a cross-sectional area of $2.45\times10^{-6}$ $mm^2$ was manufactured.

In addition, in Comparative Example 1, the insulated electric wire including no pores in the insulating layer was manufactured.

In Comparative Example 2, the insulated electric wire having an insulating layer including pores with a cross-sectional area of $4.15\times10^{-6}$ $mm^2$ was manufactured.

In Comparative Example 3, the insulated electric wire having an insulating layer including pores with a cross-sectional area of $4.91\times10^{-6}$ $mm^2$ was manufactured.

For the insulated electric wires manufactured from each of the above-described Examples 1 to 7 and Comparative Examples 1 to 3, the peak temperature, tensile strength/elongation, manufacturing or not of specimen, PDIV, and dielectric constant were measured, respectively, and shown in [Table 1] below.

TABLE 1

| Division | Insulation Thickness (μm) | Pore Cross-Sectional Area ($\times10^{-6}$ $mm^2$) | Peak Temperature (° C.) | Tensile Strength/Elongation ($kgf/mm^2$/%) | Manufacturing or not of Specimen | PDIV (V) | Dielectric Constant |
|---|---|---|---|---|---|---|---|
| Example 1 | 32 | 0.20 | 594.50 | 11.60/60.57 | ○ | 661 | 3.05 |
| Example 2 | 36 | 0.03 | 602.36 | 11.71/68.4 | ○ | 683 | 3.2 |
| Example 3 | 34 | 0.10 | 601.45 | 10.89/50.59 | ○ | 709 | 2.78 |
| Example 4 | 40 | 0.16 | 595.14 | 12.73/46.23 | ○ | 736 | 3.02 |
| Example 5 | 37 | 0.06 | 599.27 | 13.87/40.11 | ○ | 734 | 2.81 |
| Example 6 | 36 | 0.02 | 561.43 | 14.5/40.98 | ○ | 689 | 3.13 |
| Example 7 | 39 | 2.54 | 550.30 | 5.71/10.17 | ○ | 785 | 2.56 |
| Comparative Example 1 | 42 | — | 604.82 | 13.36/65.93 | ○ | 685 | 3.7 |
| Comparative Example 2 | 38 | 4.15 | 398.8 | 4.93/8.23 | x | No Measurement | No Measurement |
| Comparative Example 3 | 39 | 4.91 | 596.89 | 6.32/9.51 | x | No Measurement | No Measurement |

In Table 1, the peak temperature refers to the initial thermal decomposition peak temperature, and the cross-sectional area of the pore refers to a cross-sectional area of the largest pore among the plurality of pores found in a random cross section of the insulating layer included in the insulated electric wires according to each Example and Comparative Example.

The initial thermal decomposition temperature may be measured using thermo gravimetric analysis (TGA). More specifically, 10 mg of sample was put, the temperature was raised to a temperature increase rate of 10° C./min, and measurements were made in a nitrogen environment from 30° C. to 800° C. and in an oxygen atmosphere from 800° C. to 900° C. Here, the reason for heating in an oxygen atmosphere is to measure the mass of the remaining material after the polymer material has completely reacted. The mass change is measured at the measured temperature, and the slope is differentiated to measure the peak temperature value as the initial thermal decomposition peak temperature.

The tensile strength/elongation was measured using a film sample manufactured at a thickness of 30 μm to 50 μm for each pore size. The load and tensile length of the film sample are measured by pulling each film sample in a tensile machine at a tensile speed of 50 mm/min until the film samples break. Through this, the tensile strength and elongation of the sample were calculated using the width, thickness, and gauge length of the film sample.

After the two specimens of the insulated electric wires manufactured according to each of the above Examples and Comparative Examples are cut to a length of 100 mm, coupled, and tied at 20 mm intervals, and then the electrode is connected to the coupled end portions of the insulated electric wires whose films has been removed at 10 mm long to make the current flow depending on the voltage boosting rate of 10 V/s under conditions of a temperature of 25° C. and a relative humidity of 50% or less, the voltage value when the leakage charge is 100 pC is measured. The process is repeated five times to measure the voltage and then the average value was as the PDIV.

The dielectric constant was calculated using the dielectric constant conversion formula such as Expression 2 above by reflecting the thickness of the insulating layer and the PDIV value.

As shown in Table 1 above, it was confirmed that the insulated electric wires according to Examples 1 to 7 of the present disclosure not only have pores formed in the insulating layer, but also all include micropores with a cross-sectional area of $3.14\times10^{-6}$ $mm^2$ or less. In addition, it was confirmed that the effect of lowering the dielectric constant was obtained even at a thin insulation thickness due to the micropores present in the film, and the PDIV was improved.

Meanwhile, it was confirmed that, in the case of Comparative Example 1, no pores were formed such that the effect of lowering the dielectric constant does not appear, and in the case of Comparative Examples 2 and 3, pores were so large that the appearance defects occurring during the coating affect the mechanical and thermal properties of the insulation and the insulation performance does not appear.

Through this confirmation, it can be confirmed that the insulated electric wire 100 according to the present disclosure has low dielectric high PDIV characteristics by including the plurality of micropores with a cross-sectional area of $3.14\times10^{-6}$ $mm^2$ or less in the insulating layer 120. In order to confirm whether pores were actually formed, comparative photographs of the cross-section of the insulated electric wire according to Example of the present disclosure and the insulated electric wires according to Comparative Examples taken by SEM were shown in FIG. 2.

The SEM photograph shown in FIG. 2A is a photograph taken of the cross section of the insulated electric wire according to Example of the present disclosure, and the SEM photograph shown in FIG. 2B is a photograph taken of the cross-sections of the insulated electric wires according to Comparative Examples. From these SEM photographs, it can be confirmed that pores with much larger sizes are formed Compared to FIG. 2A.

As a result, when the plurality of micropores with a cross-sectional area of $3.14\times10^{-6}$ $mm^2$ or less are evenly dispersed in the insulating material by the insulated electric wire 100 according to the present disclosure, it can be confirmed that the problem of lowering the mechanical and thermal properties that occurs in the existing insulated electric wire is solved and the high-performance insulated electric wires can be manufactured and thus can also be applied to 1,000V class next-generation drive motors.

Those skilled in the art will appreciate that various modifications and alterations may be made without departing from the spirit or essential feature of the present disclosure. Therefore, it is to be understood that the exemplary embodiments described hereinabove are illustrative rather than being restrictive in all aspects. It is to be understood that the scope of the present disclosure will be defined by the claims rather than the above-described description and all modifications and alternations derived from the claims and their equivalents are included in the scope of the present disclosure.

DETAILED DESCRIPTION OF MAIN ELEMENTS

100: Insulated electric wires
110: Conductor
120: Insulating layer

The invention claimed is:

1. An insulated electric wire, comprising:

a conductor; and an insulating layer surrounding the conductor, wherein the insulating layer includes a varnish having a plurality of micropores with a cross-sectional area of $3.14\times10^{-6}$ $mm^2$ or less, and when a relative dielectric constant of the insulating layer is expressed as A in Expression 1 below, the relative dielectric constant A of the insulating layer satisfies Expression 2 below, $$A = 128{,}867 * t * (1/X)\text{\textasciicircum}2.173913 \quad \text{[Expression 1]}$$

$$A \leq 3.2 \quad \text{[Expression 2]}$$

in the above Expression 1, t refers to a thickness of the insulating layer, and X refers to a voltage value when a leakage charge is 100 pC after two specimens of the insulated electric wire are cut to a length of 100 mm, coupled, and tied at 20 mm intervals, and then an electrode is connected to the coupled portion of the insulated electric wire whose film is removed at 10 mm long to make a current flow depending on a voltage boosting rate of 10 V/s under conditions of a temperature of 25° C. and a relative humidity of 50% or less.

2. The insulated electric wire of claim 1, wherein the varnish includes a solvent and polyamic acid, a solid content of the polyamic acid is 20 wt % to 30 wt % based on a total weight, and a viscosity at 30° C. is 1000 cP to 15000 cP.

3. The insulated electric wire of claim 2, wherein the solvent is at least one selected from the group consisting of N-methyl-2-pyrrolidone (NMP), N,N-dimethylacetamide (DMAc), N,N-dimethylformamide (DMF), γ-butyrolactone, cyclohexanone, naphtha-based petroleum-based organic solvents, and aromatic alkyl benzenes.

4. The insulated electric wire of claim 1, wherein the insulating layer has a surface tension of 30 N/m to 45 N/m.

5. The insulated electric wire of claim 1, wherein an initial thermal decomposition temperature of the insulating layer measured using a thermo gravimetric analysis (TGA) device is within a range of 550° C. to 650° C.

6. The insulated electric wire of claim 1, wherein the insulating layer has a glass transition temperature (Tg) of 250° C. to 450° C.

7. The insulated electric wire of claim 1, wherein the insulating layer satisfies the following Expressions 3 and 4, $$10 \leq Y1 \leq 15(\text{unit: } kgf/\text{mm}^2) \quad \text{[Expression 3]}$$

$$40 \leq Y2 \leq 70(\text{unit: } \%) \quad \text{[Expression 4]}$$

in the above Expression 3, after the specimen separated from the insulating layer is manufactured in a form of a film with a thickness of 30 μm to 50 μm, a width of the specimen is uniformly cut to 10 mm, and then the specimen is placed on a tensioner grip at intervals of 30 mm in gauge length, Y1 refers to a tensile strength calculated from a load at a time when the specimen breaks, measured at room temperature at a tensile speed of 50 mm/min, and in the above Expression 4, after the specimen separated from the insulating layer is manufactured in the form of the film with the thickness of 30 μm to 50 μm, the width of the specimen is uniformly cut to 10 mm, and then the specimen is placed on the tensioner grip at intervals of 30 mm in gauge length, Y2 refers to an elongation calculated from a tensile length at the time when the specimen breaks, measured at room temperature at a tensile speed of 50 mm/min.

* * * * *